(12) United States Patent
Liu (10) Patent No.: US 12,158,854 B2
(45) Date of Patent: Dec. 3, 2024

(54) METHOD FOR STARTING COMPUTING DEVICE, COMPUTING DEVICE, AND PROGRAM PRODUCT

(71) Applicant: DELL PRODUCTS L.P., Round Rock, TX (US)

(72) Inventor: Bing Liu, Tianjin (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/987,265

(22) Filed: Nov. 15, 2022

(65) Prior Publication Data

US 2024/0104041 A1 Mar. 28, 2024

(30) Foreign Application Priority Data

Sep. 22, 2022 (CN) .......................... 202211161780.9

(51) Int. Cl.
*G06F 13/38* (2006.01)
*G06F 8/654* (2018.01)
*G06F 9/4401* (2018.01)

(52) U.S. Cl.
CPC ............ *G06F 13/385* (2013.01); *G06F 8/654* (2018.02); *G06F 9/4401* (2013.01); *G06F 2213/0028* (2013.01); *G06F 2213/0036* (2013.01)

(58) Field of Classification Search
CPC ....... G06F 13/385; G06F 8/654; G06F 9/4401
See application file for complete search history.

(56) References Cited

U.S. PATENT DOCUMENTS

| | | | |
|---|---|---|---|
| 10,180,792 B1 * | 1/2019 | Gaertner | G06F 11/1441 |
| 10,705,732 B1 * | 7/2020 | Bernat | G06F 3/0659 |
| 2008/0183917 A1 * | 7/2008 | Cagno | G06F 13/4265 710/33 |
| 2014/0359177 A1 * | 12/2014 | Florentino | G06F 13/387 710/104 |
| 2019/0116690 A1 * | 4/2019 | Chen | G06F 11/3058 |
| 2019/0179564 A1 * | 6/2019 | Bernat | G06F 3/0631 |
| 2021/0264055 A1 * | 8/2021 | Subramanian | G06F 21/575 |

* cited by examiner

*Primary Examiner* — Henry Tsai
*Assistant Examiner* — Aurangzeb Hassan
(74) *Attorney, Agent, or Firm* — WOMBLE BOND DICKINSON (US) LLP (57) ABSTRACT

Embodiments of the present disclosure provide a method for starting a computing device, a computing device, and a program product. The method includes: acquiring type information on a plurality of host bus adapter (HBA) cards of the computing device; determining a first group of HBA cards in the plurality of HBA cards based on the type information; and starting an operating system of the computing device by preventing scanning of disks connected to the first group of HBA cards. In this way, the number of storage apparatuses that need to be scanned before starting the operating system is reduced, and the starting of the operating system of the computing device is accelerated.

20 Claims, 5 Drawing Sheets

METHOD FOR STARTING COMPUTING DEVICE, COMPUTING DEVICE, AND PROGRAM PRODUCT

CROSS-REFERENCE TO RELATED APPLICATION

This patent application claims priority, under 35 U.S.C. § 119, of Chinese Patent Application No. 202211161780.9, filed Sep. 22, 2022, which is incorporated by reference in its entirety.

TECHNICAL FIELD

Embodiments of the present disclosure relate to the field of computers, and more particularly, to a method for starting a computing device, a computing device, and a computer program product.

BACKGROUND

Computing devices increase their capacity to meet users' needs by means of external storage devices. Typically, storage apparatuses such as disks may be organized as arrays and connected to a host via serial attached small computer system interfaces (SA SCSIs, or SASs for short). Cards called host bus adapters (HBAs) have been proposed to implement interconnection between hosts and storage apparatuses to provide higher performance and greater capacity.

Applications with high storage requirements (such as data backup and data protection) require a large number of HBA cards as well as disks connected to the HBA cards. These storage apparatuses need to be scanned when a device is started, so as to discover the system disk of the device and load the operating system. The presence of a large number of storage apparatuses results in long device starting time, which affects the user experience and degrades the device performance.

SUMMARY OF THE INVENTION

According to embodiments of the present disclosure, a solution for starting a computing device is provided.

According to a first aspect of the present disclosure, a method for starting a computing device is provided. The method includes: acquiring type information on a plurality of HBA cards of the computing device. The method further includes: determining a first group of HBA cards in the plurality of HBA cards based on the type information. The method further includes: starting an operating system of the computing device by preventing scanning of disks connected to the first group of HBA cards. In this way, the number of storage apparatuses that need to be scanned before starting the operating system is reduced, and the starting of the operating system of the computing device is accelerated.

According to a second aspect of the present disclosure, a computing device is provided, including: at least one processing unit, and at least one memory coupled to the at least one processing unit and storing instructions for execution by the at least one processing unit, wherein the instructions, when executed by the at least one processing unit, cause the computing device to perform a method. The method includes: acquiring type information on a plurality of HBA cards of the computing device; determining a first group of HBA cards in the plurality of HBA cards based on the type information; and starting an operating system of the computing device by preventing scanning of disks connected to the first group of HBA cards.

According to a third aspect of the present disclosure, a computer program product is provided, including machine-executable instructions, wherein the machine-executable instructions, when executed by a device, cause the device to perform the method according to the first aspect of the present disclosure.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which.

DETAILED DESCRIPTION

The embodiments of the present disclosure will be described in more detail below with reference to the accompanying drawings. Although the accompanying drawings show some embodiments of the present disclosure, it should be understood that the present disclosure can be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In addition, all specific numerical values herein are examples, which are provided only to aid in understanding, and are not intended to limit the scope in any way.

A computing device uses a non-volatile storage apparatus, such as a disk or flash memory, to store an operating system and data. When the device is started, the system disk where the program code of the operating system is stored is discovered by scanning the storage apparatus, and the program code of the operating system is loaded into the memory to start the operating system. A typical computing device has a relatively small number of storage apparatuses (e.g., a few or a dozen disks) and does not require much time to discover and load the operating system. However, some computing devices used for specific purposes (e.g., servers for data protection or data backup purposes) may have a considerable number of storage apparatuses. For example, the computing device has a group of HBA cards, wherein each HBA has a number of ports, each port being connected to one disk array. The total number of disks in the computing device may be as high as hundreds or even more. In such a case, it takes considerable time to perform scanning, which leads to extended starting time of the computing device or even failure to start.

In view of this, a method for starting a computing device is provided, wherein the computing device has a plurality of HBA cards, each of which may have a group of disks or other types of non-volatile storage apparatus attached. In this method, type information on the plurality of HBA cards of the computing device is acquired, and it is determined whether HBA cards are external cards based on the type information. It is known that an external card does not store the program code of the operating system, so an HBA card which has been determined to be an external card can be prevented from being scanned. In this way, the scan operation for disks for external cards can be skipped, thus reducing the number of disks that need to be scanned before starting the operating system and speeding up the starting of the computing device.

Some example embodiments of the present disclosure will continue to be described below with reference to FIGS. 1 to 6.

Figure 1:
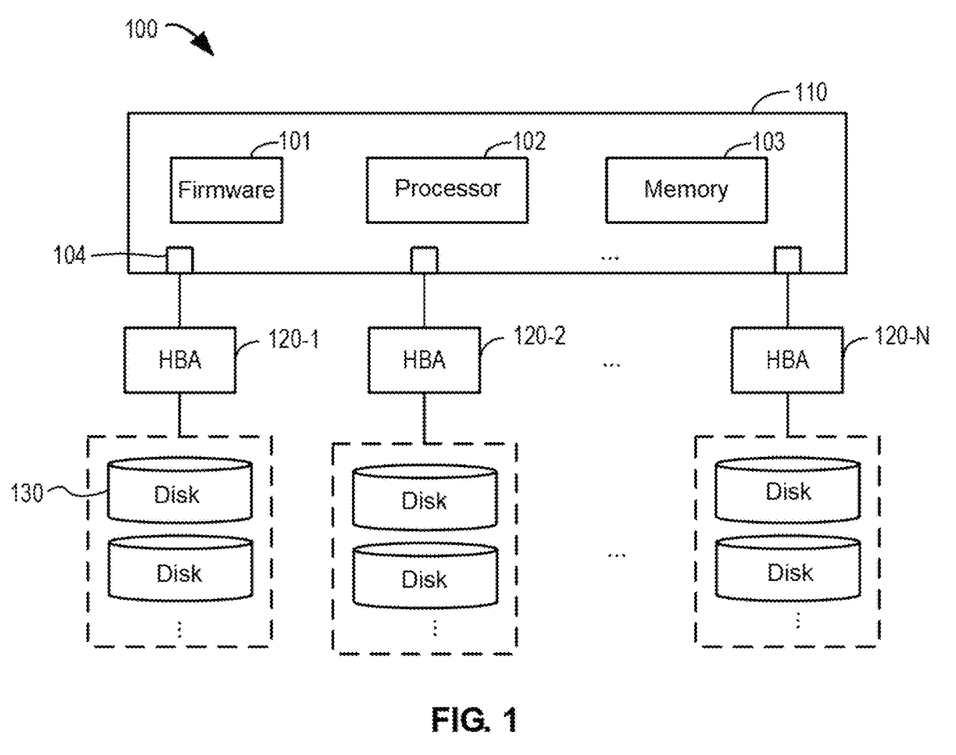
FIG. 1 illustrates a block diagram of an example environment in which some embodiments of the present disclosure may be implemented.

FIG. 1 illustrates a block diagram of example environment 100 according to some embodiments of the present disclosure. Example environment 100 generally depicts an exemplary computing device. Herein, environment 100 may be referred to as computing device 100. It should be understood that the environment shown in FIG. 1 is merely an example and should not constitute any limitation to the functions and scope of the implementations described in the present disclosure. As shown, computing device 100 includes host 110 and HBA cards 120-1, 120-2, . . . , and 120-N that are connected to host 110 via interfaces 104, with N being an integer (collectively referred to as HBA cards 120). Interfaces 104 may be high-speed peripheral interconnect interfaces (PCIes) or other types of interfaces. HBA cards 120 may also be connected to one or more disks 130 via optical fibers or serial attached SCSI (SAS) ports (not shown). Disks 130 provide non-volatile storage for the host, including a system disk that saves the program code of the operating system and a data disk.

Host 110 includes firmware 101, processor 102, and memory 103. Firmware 101 may be stored in a non-volatile storage ROM or flash memory on host 110, such as on the motherboard. Firmware 101 may include a basic input/output system (BIOS) or unified extensible interface (UEFI) firmware. When host 110 is powered up, processor 102 executes firmware 101 so that it can test or initialize the hardware environment of computing device 100 and load the bootloader into memory 103 for subsequent starting of the operating system. During this process, processor 102 of host 110 scans HBA cards 120 and their disks 130 to locate the system disk where the program code of the operating system is located. The program code of the operating system is then loaded into memory 130, and processor 102 executes the program code of the operating system to start the operating system. In some embodiments, the operating system may scan all of HBA cards 120 and their disks 130 so as to mount disks 130 to host 120 to provide storage capacity.

HBA cards 120 are provided with a non-volatile firmware. The firmware may store basic information about the HBA cards, such as the identification of or type information on the HBA cards, firmware version information, configuration parameters, vendor information, and the like. The firmware for HBA cards 120 may be updated or upgraded. When starting computing device 100, once the presence of a new HBA firmware is detected, the operating system may be started after the firmware upgrade is completed. In some embodiments, it is also possible to update the firmware for HBA cards 120 after the operating system has already been successfully started.

Disks 130 may include various types of devices having a storage function, including but not limited to a hard disk drive (HDD), a solid state disk (SSD), a removable disk, a compact disk (CD), a laser disk, an optical disk, a digital versatile disk (DVD), a floppy disk, a blue-ray disk, a serial-attached small computer system Interface (SAS SCSI) storage disk, a serial advanced technology attachment (SATA) storage disk, any other magnetic storage devices and any other optical storage devices, or any combination thereof.

Figure 2:
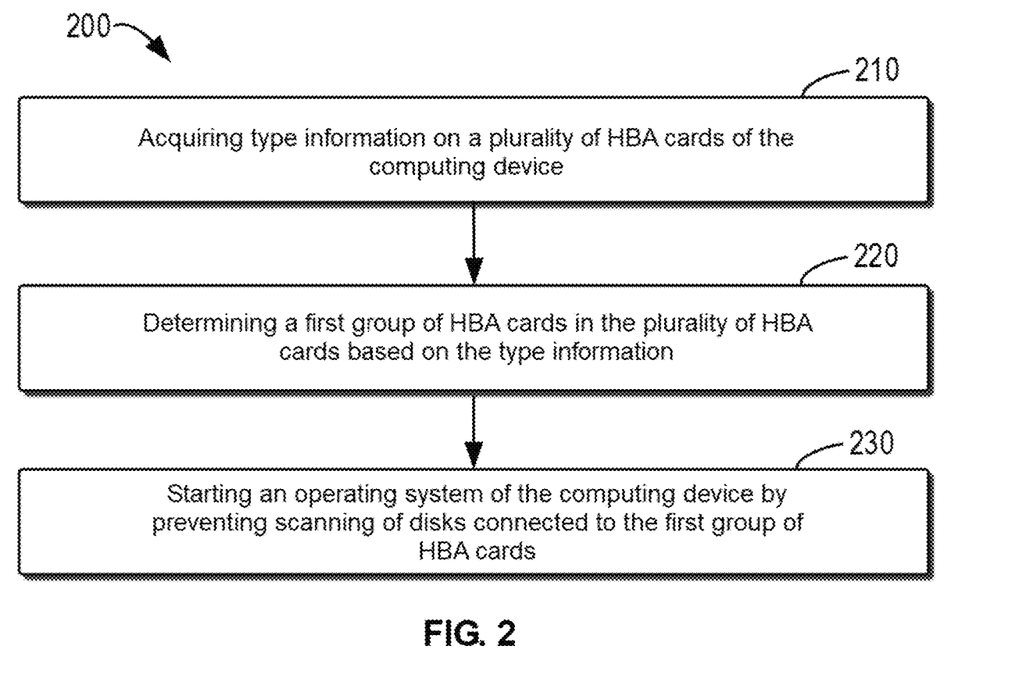
FIG. 2 illustrates a schematic flow chart of a process for starting a computing device according to some embodiments of the present disclosure.

FIG. 2 illustrates a schematic flow chart of process 200 for starting a computing device according to some embodiments of the present disclosure. Process 200 may be performed by, for example, processor 102 shown in FIG. 1. It should be understood that process 200 may also include additional actions not shown and/or omit actions shown, and the scope of the present disclosure is not limited in this regard.

At block 210, type information on a plurality of HBA cards of the computing device is acquired. Processor 102 may acquire type information on the plurality of HBA cards 120 connected to interfaces 104 of host 110 by executing the program code of firmware 101 (e.g., UEFI firmware).

The type information on HBA cards 120 is stored in their firmware. In some embodiments, in response to the starting (e.g., power-up) of computing device 100, processor 102 loads firmware 101 of host 110 of computing device 100 and acquires the type information on HBA cards 120 from the firmware of the plurality of HBA cards 120 based on firmware 101. Firmware 101 of host 110 may be UEFI firmware, and accordingly, the firmware for HBA cards 120 may include a UEFI driver. Here, the type information may be in the form of a character or character string, including but not limited to the model or identification of HBA cards 120, etc. By way of example and not limitation, the type information may include "HBA355e Adapter," "HBA355i Adapter," "HBA355i Adapter," etc.

At block 220, a first group of HBA cards in the plurality of HBA cards is determined based on the type information. Processor 120 may classify, based on the type information on the various HBA cards 120, these HBA cards 120 into HBA cards that are essential for starting the operating system and HBA cards that are not essential. The essential HBA cards are connected to the system disk of the operating system. Herein, it is known that the type information on an HBA card essential for starting the operating system has a specific character or character string, for example, an "i" character. The "i" (internal) indicates that this HBA card 120 is an internal card of computing device 100. It is known that the system disk for the operating system is connected to an HBA card for which the type information includes the character "i." Therefore, disks connected to such HBA cards need to be scanned before starting the operating system of the computing device.

Similarly, a non-essential HBA card 120 has a different specific character or character string, for example, an "e" character, with "e" (external) indicating that this HBA card 120 is an external card for computing device 100. It is known that the system disk for the operating system is not connected to an HBA card for which the type information includes the character "e." It is possible not to scan disks for such HBA cards before the operating system of the computing device is started.

In some embodiments, the first group of HBA cards are determined in response to the type information on HBA cards including a predefined character or character string. The first group of HBA cards are determined to include non-essential HBA cards, for example, HBA cards for which the type information includes the character "e."

At block 230, an operating system of the computing device is started by preventing scanning of disks connected to the first group of HBA cards. For each HBA card 120 in the first group of HBA cards, processor 102 prevents scanning of disks for that HBA card 120 by disabling the SAS port for that HBA card 120. For example, processor 102 may send a DISABLE signal to set the UEFI driver for the HBA card to make the corresponding disk 130 inaccessible.

According to method 200 described with reference to FIG. 2, processor 102 may skip scanning for external cards and only need to scan disks for all internal cards among HBA cards 120 so as to be able to start the operating system. Based on such an approach, the number of disks that need to be scanned before starting the operating system can be significantly reduced, thus enabling faster discovering of the system disk of the operating system and starting the operating system. As an example, a computing device with large storage capacity has more than hundreds of disks, and conventionally, all of them need to be scanned before the operating system can be loaded, which causes the scanning operation alone to take tens of minutes. With embodiments of the present disclosure, only a fraction of the hundreds of disks needs to be scanned to be able to start the operating system.

The starting process for the computing device includes a boot phase prior to starting the operating system as well as a phase of starting the operating system. Method 200 described with reference to FIG. 2 is capable of effectively reducing the time required for the boot phase of starting the computing device. The inventors also note that the conventional starting process also suffers from multiple factors that lead to slow starting speeds. For example, during the starting process for the operating system, the device driver of the operating system scans all the HBA cards for the computing device and mounts the attached disks. This consumes resources of the processor and causes the operating system to take too long to start. On the other hand, in a conventional method, the device driver scans disks for all the HBA cards concurrently, which may generate a large number of device event messages in a short period of time. These messages are generally transmitted to the processor via non-reliable approaches (e.g., user data packet (UDP) protocol). Flooding messages in a short period of time may cause loss of devices, that is, some disks cannot be detected. In addition, in a conventional method, the firmware update for the HBA is usually completed when the device is started, which also leads to the extension of the starting time. Additional embodiments of the present disclosure are described below with reference to FIGS. 3 through 6 and in conjunction with FIGS. 1 and 2.

Figure 3:
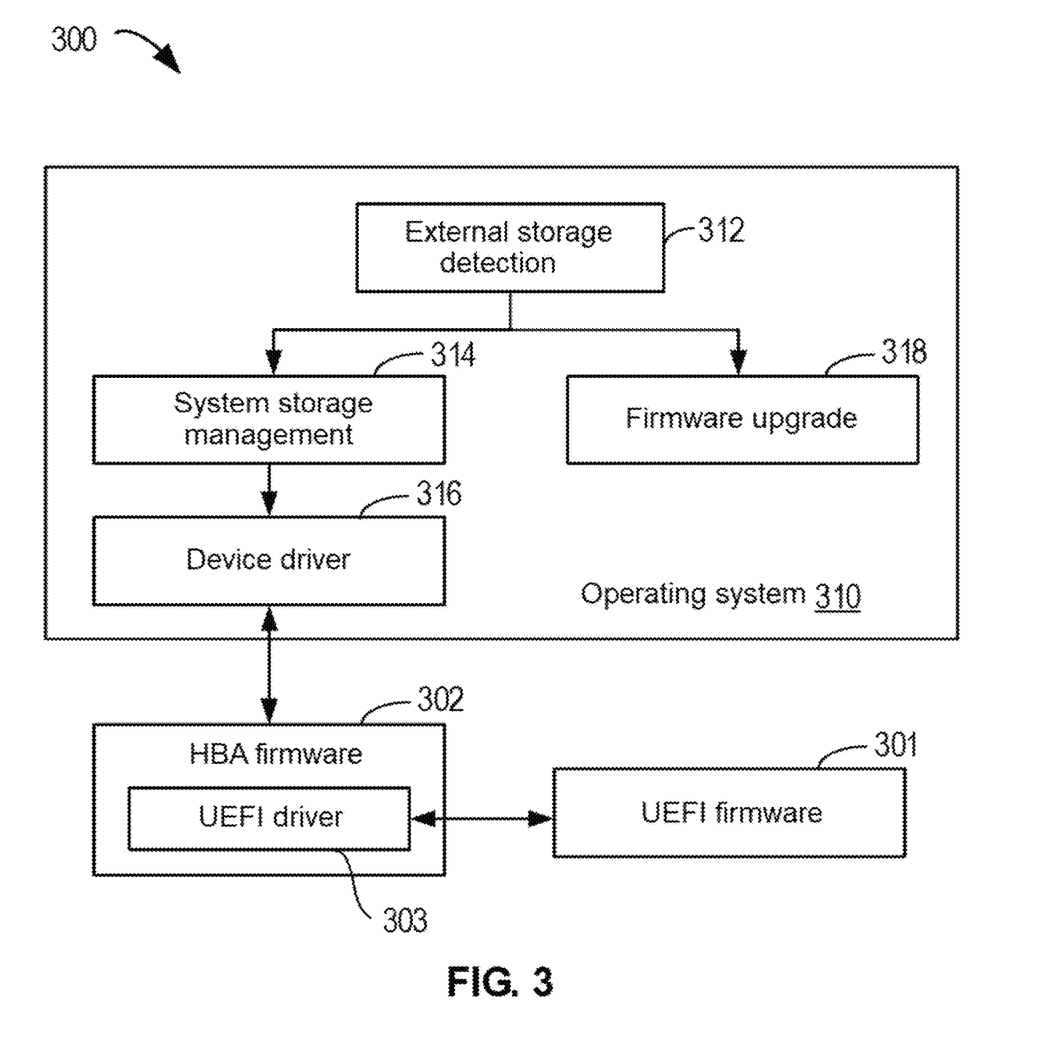
FIG. 3 illustrates a schematic diagram of components associated with starting of a computing device according to some embodiments of the present disclosure.

FIG. 3 illustrates a schematic diagram of components associated with starting of a computing device according to some embodiments of the present disclosure. In FIG. 3, UEFI firmware 301 may be an implementation of firmware 101 of computing device 100 and may be loaded when computing device 100 is powered up and executed by processor 102. HBA firmware 302 may be implemented in the non-volatile memory of HBA card 120. HBA firmware 302 includes UEFI driver 303 as well as other program codes. In order to scan HBA cards 120 and load the program code of the operating system, UEFI firmware 301 is utilized to acquire the type information on HBA cards 120 from UEFI driver 303. The type information may be used to determine disks 130 for HBA cards 120 that are not scanned prior to starting operating system 310, as described in process 200 above with reference to FIG. 2.

Operating system 310 includes external storage detection module 312, system storage management module 314, device driver module 316, and firmware upgrade module 318 that are loaded and run during starting of the operating system. External storage detection module 312 is used to help operating system 310 discover external HBA cards. Disks for the external HBA cards are not essential for starting the operating system, and thus it is possible not to scan them for the time being. System storage management module 314 is used to manage a wide variety of storage apparatuses (e.g., disks 130), including: scanning and discovering storage apparatuses, checking the availability of storage apparatuses, adding storage apparatuses to a storage resource pool, mounting storage apparatuses, deleting storage apparatuses, and the like. Device driver module 316 is used to provide interfaces between host 110 and HBA cards 120 and their disks 130 so that the operating system and other computer programs can access HBA cards 120 and their disks 130. Firmware upgrade module 318 is used to control the upgrade of firmware 302 for HBA cards 120, for example, by discovering and downloading the latest firmware locally via the network and triggering the upgrade of HBA firmware 302 at an appropriate time.

In some embodiments, external storage detection module 312 detects and discovers HBA cards that need to be scanned during the starting of the operating system and external HBA cards that do not need to be scanned. External storage detection module 312 may notify system storage management module 314 and firmware upgrade module 318 of the detection results. System storage management module 314 may in turn notify device driver module 316, and instructs device driver module 316 to scan only those disks for the HBA cards that need to be scanned and not to scan disks for the external HBA cards for the time being. As a result, the starting process for the operating system can be accelerated. Alternatively, during the starting process for the operating system, firmware update module 318 can reduce the time required to start the operating system by not triggering upgrade of firmware 302 for HBA cards 120 during the starting process for the operating system.

Figure 4:
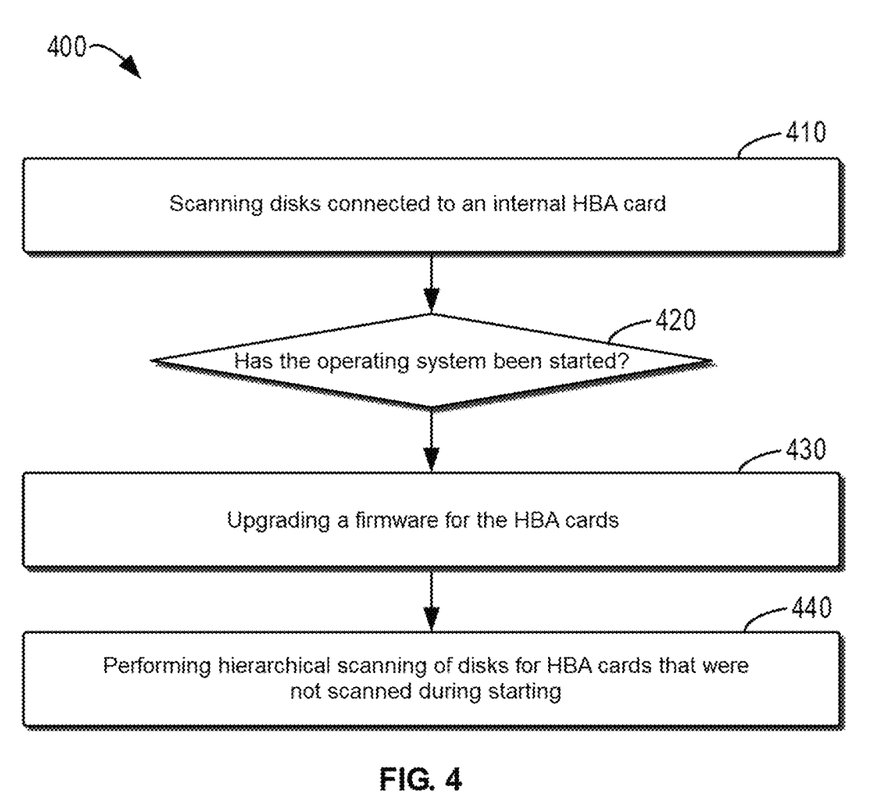
FIG. 4 illustrates a schematic flow chart of a starting process for a computing device according to some embodiments of the present disclosure.

FIG. 4 illustrates a schematic flow chart of starting process 400 for a computing device according to some embodiments of the present disclosure. Process 400 may be performed by, for example, processor 102 shown in FIG. 1. It should be understood that method 400 may also include additional actions not shown and/or may omit actions shown, and the scope of the present disclosure is not limited in this regard. Process 400 may be executed by processor 102 during the starting process for the operating system.

At block 410, disks connected to an internal HBA card are scanned. Operating system 310 may detect and discover external HBA cards using external storage detection module 312, and notify it to system storage management module 314. System storage management module 314 may in turn designate to device driver module 316 an internal HBA card that is different from the detected external HBA cards, and cause device driver module 316 to initiate a scan for the designated internal HBA card.

Figure 5:
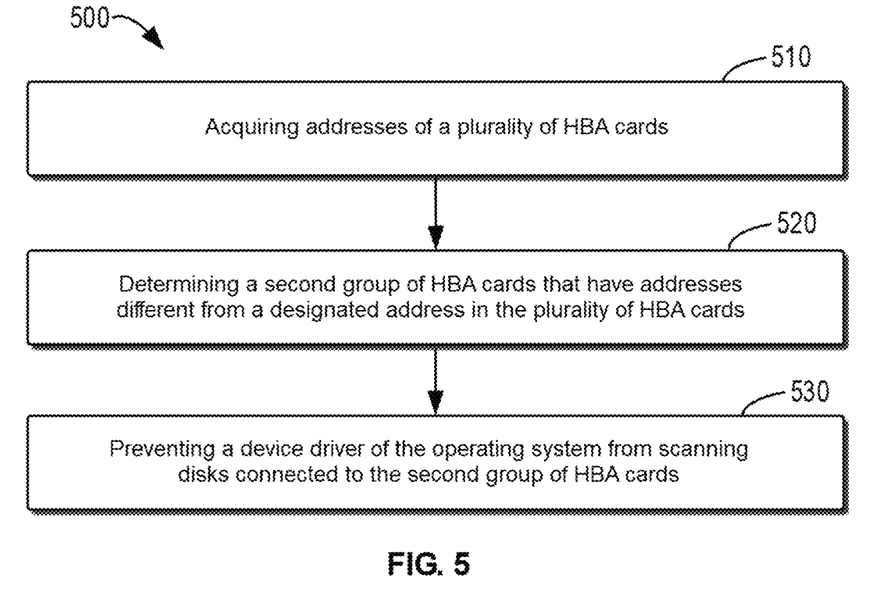
FIG. 5 illustrates a schematic flow chart of a process for scanning HBA cards by an operating system according to some embodiments of the present disclosure.

Reference may be made to FIG. 5, which illustrates a schematic flow chart of process 500 for scanning HBA cards by the operating system. Process 500 may be implemented as an exemplary implementation of step 410 of FIG. 4. At block 510, addresses of a plurality of HBA cards are acquired. Specifically, external storage detection module 312 may acquire an address (e.g., PCIe device address) of interface 104 to which each HBA card 120 is connected.

At block 520, a second group of HBA cards that have addresses different from a designated address are determined in the plurality of HBA cards. The designated address that the internal HBA card has is known (e.g., being installed in one or more specific slots on the motherboard), so the addresses of the external HBA cards are different from the designated address. The second group of HBA cards includes external HBA cards that have addresses different from the designated address. The second group of HBA cards may be the same or partially the same as the first group of HBA cards determined based on the type information described with reference to FIG. 2.

At block 530, a device driver of the operating system is prevented from scanning disks connected to the second group of HBA cards. In some embodiments, the scanning of the disks connected to the second group of HBA cards may be prevented by disabling SAS ports to the second group of HBA cards. Alternatively, by indicating to device driver module 316 only the addresses of HBA cards to be scanned (i.e., the internal HBA cards), it is also possible to cause device driver module 316 to scan only the designated HBA cards and disks.

Returning to FIG. 4, at block 420, it is determined whether the operating system has been started. In some embodiments, in response to initiating a user interaction regarding the operating system, it is determined that the operating system has been started. The user interaction includes prompting for the input of authentication information such as a user name, a password, etc. Initiating a user interaction means that the basic functionality of the operating system is ready, and the user can use the computing device without further waiting. Thus, the user interaction can be used as a division point, where operations prior to the user interaction are considered essential and operations after the user interaction may be executed relatively later. Based on such an approach, the user experience at the starting of the device can be improved.

At block 430, a firmware for the HBA cards is upgraded. Deferring the execution of the firmware upgrade until after the operating system has already been started can reduce unnecessary additional latency. For example, firmware upgrade module 318 may discover via the network whether the firmware for one or more HBA cards 120 is the latest and perform a firmware upgrade if it is not. In some embodiments, firmware upgrades may be performed concurrently for HBA cards 120 that need to be upgraded.

At block 440, hierarchical scanning is performed for disks of HBA cards that were not scanned during starting. As mentioned above, the sudden discovery of a large number of disks may result in the loss of device discovery messages, and thus some disks cannot be mounted to the host. For unscanned HBA cards, system storage management module 314 may control device driver module 316 to scan these HBA cards in a hierarchical manner, so as to avoid the loss of device discovery messages due to burst scanning.

In some embodiments, the second group of HBA cards determined above as external HBA cards includes at least two HBA cards. System storage management module 314 controls device driver module 316 to intermittently initiate scanning of these HBA cards at a predetermined time interval. Specifically, system storage management module 314 notifies device driver module 316 of the address of one HBA card, and device driver module 316 enables the SAS port for that HBA card and scans disks connected to that HBA card. Accordingly, a device discovery message is generated, and the processor can add the disks to the host as available storage resources. After the predetermined time interval (e.g., 10 seconds, 15 seconds, 20 seconds, or any other value), system storage management module 314 notifies device driver module 316 of the address of the next HBA card, and similarly, device driver module 316 enables the SAS port for that HBA card and scans disks connected to that HBA card, then adds more storage resources, and so on. Thus, the mounting of the storage apparatus can be completed in a relatively idle manner after the starting of the operating system of the computing device has already been completed, so as to avoid loss.

Figure 6:
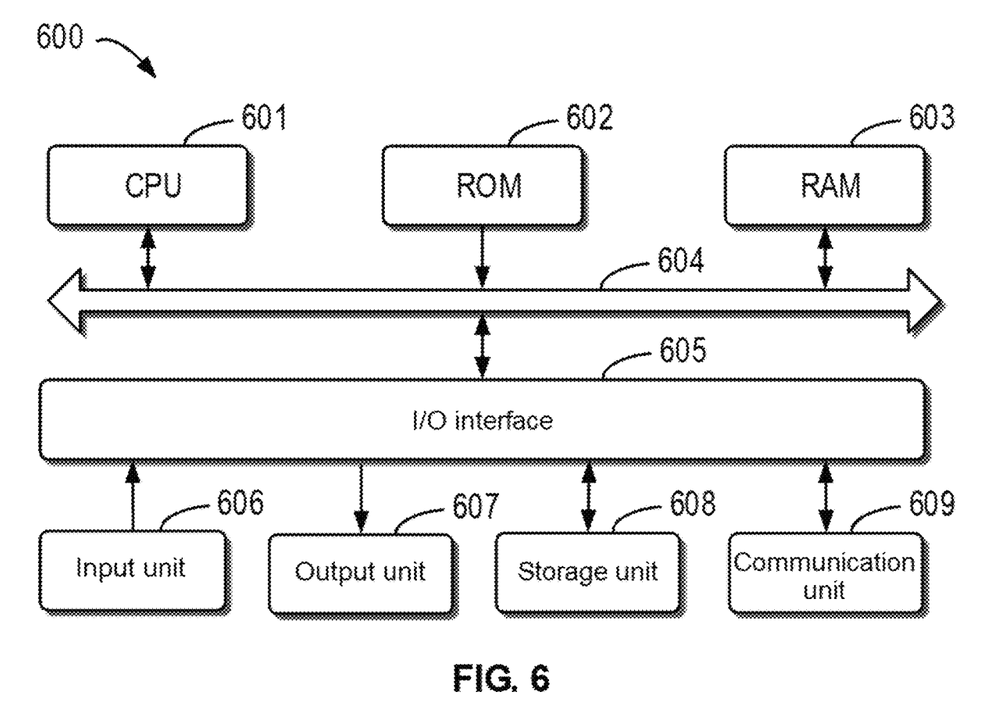
FIG. 6 illustrates a schematic block diagram of an example device that may be used to implement some embodiments of the present disclosure.

FIG. 6 illustrates a schematic block diagram of example device 600 that may be used to implement some embodiments of the present disclosure. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 700 may also be stored in RAM 603. CPU 601, ROM 602, and RAM 603 are connected to each other through bus 604. Input/output (I/O) interface 605 is also connected to bus 604.

A plurality of components in device 700 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 700 to exchange information/data with other devices via a computer network such as the Internet and/or various telecommunication networks.

The individual processes and processing described above, such as methods or processes 200, 400, 500, can be performed by processing unit 601. For example, in some embodiments, methods or processes 200, 400 and 500 may be implemented as a computer software program that is tangibly included in a machine-readable medium such as storage unit 608. In some embodiments, part of or all the computer program may be loaded and/or installed onto device 700 via ROM 602 and/or communication unit 609. One or more actions of methods or processes 300, 400, and 500 described above may be performed when the computer program is loaded into RAM 603 and executed by CPU 601.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information for the computer-readable program instructions. The electronic circuit may execute the computer-readable program instructions so as to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

The invention claimed is:

1. A method for starting a computing device, comprising:
acquiring type information of a plurality of host bus adapter (HBA) cards of the computing device;
acquiring addresses of the plurality of HBA cards;
determining, from the plurality of HBA cards, a first group of HBA cards based on the type information;
determining, from the plurality of HBA cards, a second group of HBA cards that have addresses different from a designated address; and
starting an operating system of the computing device by preventing scanning of disks connected to the first group of HBA cards and the second group of HBA cards.

2. The method according to claim 1, wherein preventing scanning of disks connected to the first group of HBA cards comprises:
disabling serial attached SCSI (SAS) ports to the first group of HBA cards.

3. The method according to claim 2, wherein determining a first group of HBA cards in the plurality of HBA cards comprises:
determining the first group of HBA cards in response to determining that the type information on the first group of HBA cards in the plurality of HBA cards comprises a predefined character or character string.

4. The method according to claim 1, wherein acquiring type information on a plurality of HBA cards of the computing device comprises:
loading, in response to starting of the computing device, a unified extensible firmware interface (UEFI) firmware of the computing device; and
acquiring the type information from a firmware for the plurality of HBA cards based on the loading of the UEFI firmware.

5. The method according to claim 1, further comprising:
upgrading a firmware for the first group of HBA cards in the plurality of HBA cards after the operating system has been started.

6. The method according to claim 5, further comprising:
determining, in response to initiating a user interaction regarding the operating system, that the operating system has been started.

7. The method according to claim 1, further comprising:
controlling, after the operating system has been started, the device driver to scan disks connected to the second group of HBA cards, to add the disks connected to the second group of HBA cards to the computing device.

8. The method according to claim 7, wherein the second group of HBA cards comprises at least two HBA cards, and controlling the device driver to scan disks connected to the second group of HBA cards comprises:
initiating, intermittently by the device driver, scanning of disks connected to the at least two HBA cards at a predetermined time interval.

9. A computing device, comprising:
at least one processor; and
at least one memory coupled to the at least one processor and storing instructions for execution by the at least one processor, wherein the instructions, when executed by the at least one processor, cause the computing device to perform a method comprising:
acquiring type information of a plurality of host bus adapter (HBA) cards of the computing device;
acquiring addresses of the plurality of HBA cards;
determining, from the plurality of HBA cards, a first group of HBA cards based on the type information;
determining, from the plurality of HBA cards, a second group of HBA cards that have addresses different from a designated address; and
starting an operating system of the computing device by preventing scanning of disks connected to the first group of HBA cards and the second group of HBA cards.

10. The computing device according to claim 9, wherein preventing scanning of disks connected to the first group of HBA cards comprises:
disabling serial attached SCSI (SAS) ports to the first group of HBA cards.

11. The computing device according to claim 10, wherein determining a first group of HBA cards in the plurality of HBA cards comprises:
determining the first group of HBA cards in response to determining that the type information on the first group of HBA cards in the plurality of HBA cards comprises a predefined character or character string.

12. The computing device according to claim 9, wherein acquiring type information on a plurality of HBA cards of the computing device comprises:
loading, in response to starting of the computing device, a unified extensible firmware interface (UEFI) firmware of the computing device; and
acquiring the type information from a firmware for the plurality of HBA cards based on the loading of the UEFI firmware.

13. The computing device according to claim 9, wherein the method further comprises:
upgrading a firmware for the first group of HBA cards in the plurality of HBA cards after the operating system has been started.

14. The computing device according to claim 13, wherein the method further comprises:
determining, in response to initiating a user interaction regarding the operating system, that the operating system has been started.

15. The computing device according to claim 9, the method further comprises:
controlling, after the operating system has been started, the device driver to scan disks connected to the second group of HBA cards, so as to add the disks connected to the second group of HBA cards to the computing device.

16. The computing device according to claim 15, wherein the second group of HBA cards comprises at least two HBA cards, and controlling the device driver to scan disks connected to the second group of HBA cards comprises:
initiating, intermittently by the device driver, scanning of disks connected to the at least two HBA cards at a predetermined time interval.

17. A computer program product comprising machine-executable instructions that, when executed by a device, cause the device to perform a method, the method comprising:
acquiring type information of a plurality of host bus adapter (HBA) cards of the computing device;
acquiring addresses of the plurality of HBA cards;

determining, from the plurality of HBA cards, a first group of HBA cards based on the type information;

determining, from the plurality of HBA cards, a second group of HBA cards that have addresses different from a designated address; and starting an operating system of the computing device by preventing scanning of disks connected to the first group of HBA cards and the second group of HBA cards.

18. The computer program product according to claim 17, wherein preventing scanning of disks connected to the first group of HBA cards comprises:

disabling serial attached SCSI (SAS) ports to the first group of HBA cards.

19. The computer program product according to claim 17, wherein preventing scanning of disks connected to the first group of HBA cards comprises:

disabling serial attached SCSI (SAS) ports to the first group of HBA cards.

20. The computer program product according to claim 17, further comprising:

upgrading a firmware for the first group of HBA cards in the plurality of HBA cards after the operating system has been started.

* * * * *